Figure 1:
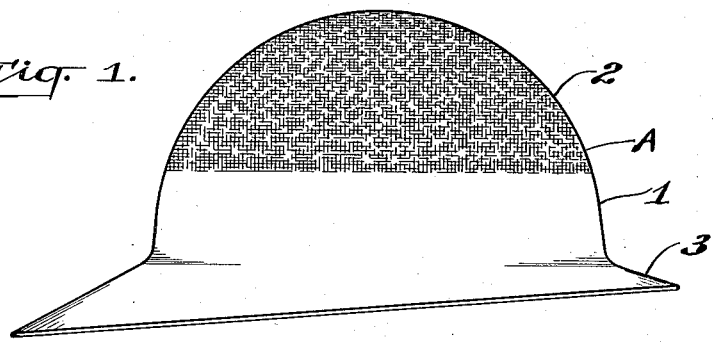

Feb. 23, 1943.  W. P. YANT  2,312,227
PROTECTIVE HAT
Filed Aug. 3, 1940

INVENTOR.
WILLIAM P. YANT
BY Frank E. Foote
his ATTORNEY.

Patented Feb. 23, 1943

2,312,227

UNITED STATES PATENT OFFICE 2,312,227

PROTECTIVE HAT

William P. Yant, Pittsburgh, Pa., assignor to Mine Safety Appliances Company, Pittsburgh, Pa.

Application August 3, 1940, Serial No. 350,913

7 Claims. (Cl. 2—3)

This invention relates to safety hats or helmets worn by miners, mill and steel workers, linemen and other persons for whom it is desirable or necessary that hats be of an electrical non-conducting nature and be a protection of the head against injury, and, more particularly, to an improvement in molded reinforced hats comprising a matrix of plastic material having an integral, electrically non-conducting, strong reinforcement embedded in the matrix and preferably uniformly spaced from the sides of the plastic material, and to a method of making same.

Heretofore, molded headgear made of plastic material such as the synthetic resins and cellulose derivatives have been reinforced by a layer of wire fabric, such as disclosed in Patent No. 1,835,883, issued to J. M. Lewis. Wire fabric is used principally to provide the necessary strength and rigidity to the plastic material without requiring materially any substantial increase in the thickness and the weight of the helmet. Aside from manufacturing difficulties encountered in the use of wire fabric as a reinforcement, its electrical conducting property limits its use for reinforcing safety hats made of plastic material.

In the manufacture of safety hats with woven wire material, the layer has a tendency to move or float to the surface of the plastic material during the molding operation, and, in many instances, pierces or perforates the outer surface of the plastic material or is disposed so near to the outer surface that after very limited use the wire becomes exposed. Furthermore, the nature of wire material inhibits intimate bonding of the plastic material to the wire, and, as disclosed in Lewis, it was proposed to cement wire to layers of textile fabrics. This arrangement makes the molding of the helmet, the positioning of the reinforcement in the plastic matrix and the bonding of the plastic material to the reinforcement difficult and expensive.

At the intersections of strands in a wire fabric, void spaces occur in the plastic material under the overlying strand, and as helmets are made relatively thin, this condition weakens materially the strength of the hat, and, in some instances, the overlying portion pierces through the outer surface of the plastic material unless some additional means is employed to overlie the wire material. Also, due to the difficulty in shaping large pieces of wire fabric by a plastic molding operation, wire fabric can be placed only in the upper crown portion of the hat.

An object of this invention is to provide a molded safety hat having a strong, electrical non-conducting reinforcement suitably embedded in a matrix of plastic material and which may extend over the entire surface of the hat, and a method of making same.

A further object of this invention is to provide a strong, pliable, readily formable, distortable, inexpensive, and woven reinforcing material for safety hats which is readily bondable to plastic material and sufficiently porous so that plastic material, such as synthetic resin and cellulose derivative materials, flow through the openings in the weave in the material under molding temperatures and pressures to uniformly embed the reinforcement in a matrix of plastic material.

Figure 2:
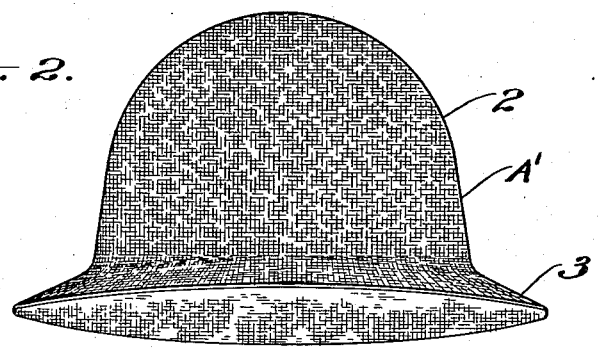
Figure 3:
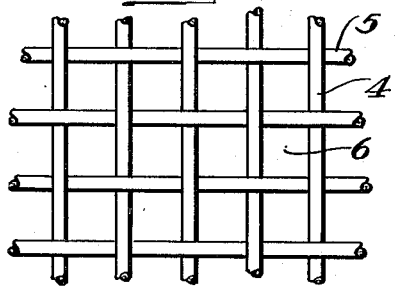
Figure 4:
Figure 5:
Figure 6:
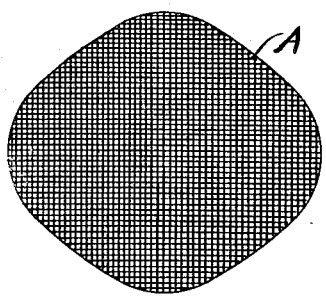
Figure 7:
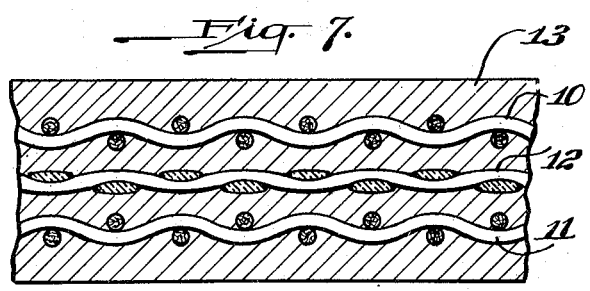

Other objects and advantages of this invention will become apparent from the following specification and drawing in which; Fig. 1 is a side elevational view of a type of safety hat and illustrates a glass reinforcement extending part way down the crown of the hat. Fig. 2 is a front elevational view illustrating a glass reinforcement extending throughout the crown and brim portions of the hat. Fig. 3 is an illustrative and enlarged view of a type of weave suitable as a reinforcement. Figs. 4 and 5 are illustrative views showing glass woven fabric before and after a molding operation. Fig. 6 is an illustration of a fabric shape for reinforcing the upper crown of a hat, such as in Fig. 1. Fig. 7 is another embodiment of this invention illustrating the use of textile fabrics or other formable reinforcements in addition to a woven glass fabric material.

The hat I as illustrated in Figs. 1 and 2 is composed of a crown portion 2 and an integral brim portion 3. This style of hat is commonly used in the manufacture of molded safety hats to which this invention is directed and a detailed description of this manufacture and characteristics of this hat will disclose the principles involved, but it is not intended that this invention be limited to this specific type of hat.

The reinforcement is a woven fibrous glass material used in combination with formable material, such as the phenolic resins or cellulose derivative materials. The glass material is treated or manufactured to be bondable to plastic material and this is known in the art. This fibrous glass material is made up of strands of minute fibers of glass which are twisted (not shown) and form a composite strong strand of material. It is preferred that the glass fibers be well lubricated with one of the materials which has been found suitable for this purpose, such as, methyl methacrylate or tricresyl phosphate in order to avoid cutting of the fibers when woven and used in reinforcing plastic material. These strands may be woven into an ordinary design, such as illustrated in Figs. 3 and 4, wherein the individual strands 4 and 5 run in two distinct directions. It is recognized that many types of weave can be used provided that a distinct opening, such as at 6, is made to allow the passage of plastic material. These individual fibers of material making up the strands are capable of being distorted from the woven state under ordinary molding temperatures and pressures, and they assume a shape, what is thought to be of a nature, such as illustrated in Fig. 5. At the intersections of the strands, each of them flatten to such an extent that the thickness of the fabric is made somewhat uniform, thus eliminating the void spaces at the intersections of the strands as illustrated by comparing Fig. 4 and Fig. 5. It has been found in actual practice that with the use of wire fabric these spaces at the intersection of the individual wires are very difficult to fill with plastic material by the usual molding operation.

In the molding of plastic helmets, the reinforcing material is usually placed in a mold cavity and supported so that the necessary thickness of plastic layers may be added to the surfaces of the reinforcement. Should the conventional molding practice be followed, the layers of plastic material are placed in the mold cavity defined by mold pieces (not shown), and the reinforcement is positioned in relation to the layers of plastic material. Should the injection molding process be followed, it is necessary to amply support the reinforcement in the mold cavity sufficient to withstand the injection of the plastic material into the cavity. Whichever method is followed, molding pressures and temperatures are applied to the mass of plastic material to form into the desired shape and the minutely fibrous woven glass reinforcement, is, relatively speaking, distorted to a shape, as illustrated in Fig. 5. Because of this distortion, due to the minutely fibrous character of the strands and the porosity of the weave, the reinforcement is completely impregnated with plastic material 8 so that a hat is composed of a matrix of plastic material having a reinforcement completely and uniformly embedded therein. By properly lubricating the material in each strand the shaping of the cloth prevents any cutting of the individual fibers when drawn or pressed into shape during molding.

The fibrous glass material, although formed in a weave having spaces or openings 6 of sufficient size to allow a flow of plastic material and to uniformly embed the reinforcement, has sufficient strength in the necessary directions to meet the shock and weight tests given to safety hats. By the use of glass fibrous material a uniform reinforced plastic matrix can be made and substantially without any voids of plastic material throughout the extent or thickness of the material with the result that the plastic matrix has a strength sufficient for purposes of safety appliance manufacture. While it is preferred to use layers of plastic material separate from the glass fibrous material and then by heat and pressure mold the layers together into the desired shape, impregnated layers of material can be used and then by the application of heat and pressure set the impregnated material to the desired shape.

The woven glass material gives strength in all necessary directions and in a most limited space and because of its ready distortion at the locations of overlie does not cause any of the difficulties encountered in the use of wire fabric. This feature makes available a hat of relatively thin section adequately strong and rigid.

Because of the readily formable character of glass fibrous material, it can be used to reinforce the entire extent of a molded article of a decided concavo-convex contour. In the case of molding hats, the reinforcement can be made to extend throughout the entire extent of the hat, that is, to be included both in the crown and brim portions. In safety hats, because of the formability of glass material and its complete impregnation by plastic material, a hat can be readily restored to its original shape after being distorted, as by a falling object, without resulting in any separation of the glass from the plastic material.

If it should be desired to merely reinforce the upper crown portion, the glass layer A, Fig. 1 may be cut such as illustrated in Fig. 6. However, by the use of this fibrous material, the entire hat can be reinforced with a layer of material, as A', in Fig. 2.

If it is desired to additionally reinforce the plastic article, the formable materials, such as illustrated in the Lewis patent, heretofore mentioned, may be placed on each side of the glass fibrous material and held in spaced relation thereto by the plastic matrix. However, it is not necessary to use these additional layers to prevent the cloth from piercing through the formable material since its characteristic is to bond itself to the material and thus hold itself in place although the strands of material being made of thin fibers shape themselves as illustrated in Figs. 5 and 7.

Referring specifically to Fig. 7, the layers of textile fabrics 10 and 11 are shown in an illustrative fashion since it is not intended to disclose what effect the molding of plastic material 13 has in impregnating the textile fabrics. The glass fibrous layer 12 is illustrated in its distorted condition, although it is not intended that this disclosure of an effect be a limitation of invention since a fibrous material of glass may be made which may not distort in such a manner but is within the scope of the invention.

It has been found that a glass fabric or cloth having strands of a thickness substantially that of the ordinary textile fabric which is used in reinforcing plastic materials, such as safety helmets, is satisfactory as a reinforcement, but the material employed will depend upon the thickness of the hat and the desired strength of this will be governed by the size and nature of the fibers and strands used. Individual strands or filters of glass material may be used without being formed into a weave but this arrangement does not have all the advantages mentioned heretofore in connection with the use of cloth.

According to the provisions of the patent statutes, I have explained the principle and mode of operation of my invention, and have illustrated and described an embodiment. I desire to have it understood that the detailed description of what I consider to be conditions present in the embodiment does not imply any limitation of the invention except as set forth in the appended claims.

I claim:

1. A molded safety hat comprising a crown portion, the crown portion being composed of glass fibrous material embedded in a matrix of formable material.

2. A molded electrically non-conducting headgear of formable material and a reinforcing layer of woven glass fibrous material embedded in the formable material, the strands of the woven material being of a thinness readily conformable to the shape of the headgear and each of the strands being integrally bonded substantially throughout to the formable material to provide a unitary structure having a complete and substantially uniform covering of plastic material over the entire surface of the fibrous material.

3. A molded headgear comprising integral crown and brim portions of plastic material and a reinforcement of glass fibrous material readily conformable to the shape of the headgear and integrally bonded throughout to the plastic material and uniformly positioned from the outside surfaces thereof.

4. A molded headgear comprising integral crown and brim portions of plastic material, and a reinforcing layer of lubricated glass fibrous material composed of strands made of minutely fibrous glass material and embedded in the plastic material and integrally bonded throughout to the plastic material providing a unitary and composite structure having a complete and substantially uniform covering of plastic material over the entire surfaces of the fibrous material.

5. A molded headgear comprising integral crown and brim portions of plastic material, and a reinforcement therefor comprising a layer of woven glass fibrous material composed of strands of material made of minute fibres and woven so as to have sufficient porosity to allow the flow of plastic therethrough and a layer of formable reinforcing material adjacent to each of the surfaces of the glass fibrous material and in spaced relation thereto, each of said layers in the reinforcement being substantially uniformly spaced from each other and from the outside surfaces of the plastic material and being integrally bonded to the plastic material throughout their entire surface.

6. A molded headgear comprising integral crown and brim portions of plastic material, and a reinforcing layer of lubricated woven glass material of a thinness readily conformable to the shape of the headgear and having sufficient porosity so that the plastic material substantially completely covers the strands of the woven material, the strands of the woven material being deformable so that at the intersections of the strands of the material each strand is deformed to provide a layer having substantially a uniform thickness and relatively plane flat surfaces whereby the reinforcing material is uniformly bonded to the plastic material without the formation of voids in the plastic material and the glass material is uniformly spaced from the outer surfaces of the plastic material.

7. A molded electrically non-conducting headgear comprising integral crown and brim portions of plastic material, and a reinforcement comprising a layer of woven glass fibrous material of a thinness readily conformable to the shape of the headgear and having sufficient porosity to allow the flow of plastic therethrough and a layer of formable reinforcing material adjacent to each of the surfaces of the woven glass fibrous material and spaced therefrom and from the adjacent outside surface of the plastic material, each layer being integrally bonded to the plastic material.

WILLIAM P. YANT.